(12) United States Patent
Nakashiba et al.

(10) Patent No.: US 10,921,515 B2
(45) Date of Patent: Feb. 16, 2021

(54) SEMICONDUCTOR DEVICE AND METHOD OF MANUFACTURING THE SAME

(71) Applicant: RENESAS ELECTRONICS CORPORATION, Tokyo (JP)

(72) Inventors: Yasutaka Nakashiba, Ibaraki (JP); Shinichi Watanuki, Ibaraki (JP); Tohru Kawai, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/681,372

(22) Filed: Nov. 12, 2019

(65) Prior Publication Data

US 2020/0192039 A1 Jun. 18, 2020

(30) Foreign Application Priority Data

Dec. 12, 2018 (JP) .................. 2018-232160

(51) Int. Cl.
*G02B 6/12* (2006.01)
*G02B 6/13* (2006.01)
*G02F 1/025* (2006.01)
*G02B 6/42* (2006.01)

(52) U.S. Cl.
CPC ............... *G02B 6/12* (2013.01); *G02B 6/13* (2013.01); *G02F 1/025* (2013.01); *G02B 6/12004* (2013.01); *G02B 6/4254* (2013.01); *G02B 6/4283* (2013.01)

(58) Field of Classification Search
None
See application file for complete search history.

(56) References Cited

U.S. PATENT DOCUMENTS

| 9,696,489 | B2 | 7/2017 | Watanuki et al. | |
|---|---|---|---|---|
| 2009/0274418 | A1* | 11/2009 | Holzwarth | G02B 6/122 385/30 |
| 2017/0329081 | A1* | 11/2017 | Mahgerefteh | G02B 6/2726 |
| 2018/0128974 | A1* | 5/2018 | Iida | H01L 21/84 |
| 2019/0206850 | A1* | 7/2019 | Steglich | G02B 6/1225 |
| 2019/0302487 | A1* | 10/2019 | Huang | G02F 1/025 |
| 2019/0361180 | A1* | 11/2019 | Lam | G02B 6/13 |

FOREIGN PATENT DOCUMENTS

JP 2016-180860 A 10/2016

* cited by examiner

*Primary Examiner* — Michael Stahl
(74) *Attorney, Agent, or Firm* — McDermott Will & Emery LLP

(57) ABSTRACT

A semiconductor device includes a substrate having a first surface and a second surface that have top and back relation, an insulating layer formed on the first surface of the substrate, and an optical waveguide formed on the insulating layer and formed of a semiconducting layer. A first opening is formed on the second surface of the substrate. The first opening overlaps the optical waveguide in plan view.

16 Claims, 23 Drawing Sheets

Semiconductor Device and Method of Manufacturing the Same

CROSS-REFERENCE TO RELATED APPLICATIONS

The disclosure of Japanese Patent Application No. 2018-232160 filed on Dec. 12, 2018 including the specification, drawings and abstract is incorporated herein by reference in its entirety.

BACKGROUND

The present embodiments relate to a semiconductor device and a method of manufacturing the same.

As an optical communication technique, a silicon photonics technique is known. The semiconductor device employing the silicon photonics technique includes, for example, a semiconductor substrate, a first insulating layer formed on the semiconductor substrate, an optical waveguide formed on the first insulating layer, and a second insulating layer formed on the first insulating layer so as to cover the optical waveguide. The refractive index of the material constituting the optical waveguide is greater than the refractive indices of the materials constituting the first insulating layer and the second insulating layer. This allows light to travel along the optical waveguide while substantially confined inside the optical waveguide.

A semiconductor device having an optical waveguide covered with an air-layer instead of an insulating film such as silicon oxide is known from the viewpoint of enhancing the effects of confining light inside the optical waveguide. For example, in the semiconductor device described in Japanese Unexamined Patent Application Publication No. 2016-180860, a lower surface and both side surfaces of the optical waveguide are in contact with a cavity which is the air-layer (see FIG. 21 to be described later).

However, in the semiconductor device described in Japanese Unexamined Patent Application Publication No. 2016-180860, a portion (for example, a wiring layer) located above the optical waveguide needs to be formed while the cavity covering the lower surface and both side surfaces of the optical waveguide is formed. Therefore, in the semiconductor device described in Japanese Unexamined Patent Application Publication No. 2016-180860, there is room for improvements from the viewpoint of reliability of semiconductor device.

It is an object of embodiments to increase the reliability of the semiconductor device. Other objects and novel features will become apparent from the description of the specification and drawings.

SUMMARY

A semiconductor device according to embodiments includes a substrate having first and second surfaces that have a top and back relation with each other, an insulating layer formed on/in the first surface, and an optical waveguide formed on the insulating layer and formed of a semiconducting layer. A first opening is formed on the second surface.

A method of manufacturing a semiconductor device according to other embodiments includes providing a semiconductor wafer including a substrate having a first surface and a second surface that have top and back relation, an insulating layer formed on the first surface, and an optical waveguide formed of a semiconductor layer formed on the insulating layer, and forming a first opening on the second surface in plan view after forming a wiring layer on the semiconductor wafer.

DETAILED DESCRIPTION

Figure 1:
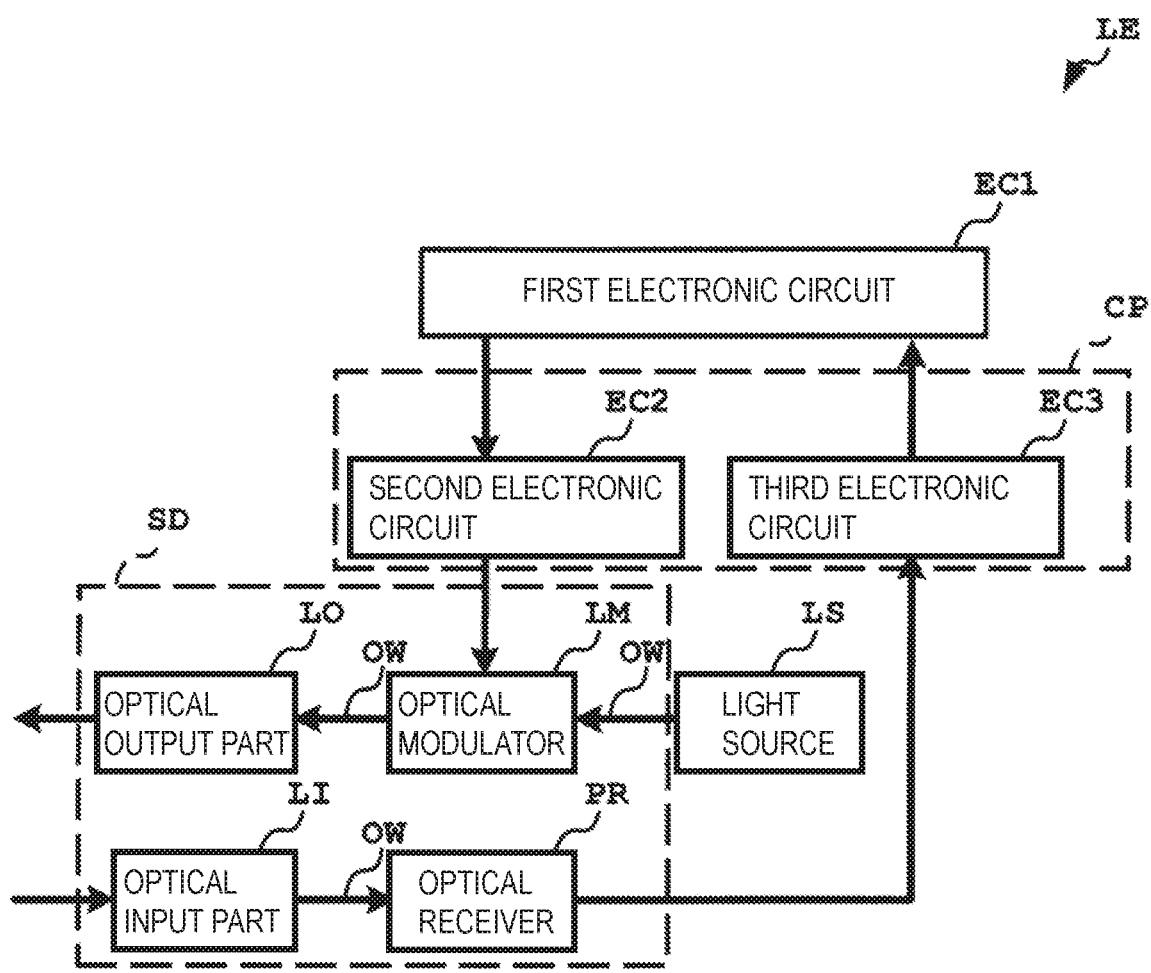
FIG. 1 is a block diagram showing an exemplary circuit configuration of an optoelectronic electric device according to an embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments and each modification may be arbitrarily combined with each other.

FIG. 1 is a block diagram showing an exemplary circuit configuration of an opto-electric hybrid device LE according to a present embodiment.

As shown in FIG. 1, the photoelectric hybrid device LE includes first electronic circuit EC1, a semiconductor device SD, a light source LS, and IC chip CP. The semiconductor device SD according to the present embodiment includes an optical waveguide OW, an optical modulator LM, an optical output part LO, an optical input unit LI, and a light receiving unit PR. The IC chip CP includes a second electronic circuit EC2 and a third electronic circuit EC3. The configuration of the semiconductor device SD will be described in detail later.

The first electronic circuit EC1 outputs electric signal for controlling the second electronic circuit EC2 and the third electronic circuit EC3, respectively. The first electronic circuit EC1 receives electric signal outputted from the third electronic circuit EC3. The first electronic circuit EC1 is electrically connected to the second electronic circuit EC2 and the third electronic circuit EC3. The first electronic circuit EC1 is formed of, for example, a known Central Processing Unit (CPU) or Field-Programmable gate array (FPGA) including a control circuit and a storage circuit.

The light source LS emits light. Examples of the type of light source LS include a laser diode LD. A wavelength of the light emitted from the light source LS may be set as appropriate in accordance with the material constituting the optical waveguide OW as long as the emitted light can pass through the inside of the optical waveguide OW. For example, the peak wavelength of the light emitted from the light source LS is 1.0 µm or more and 1.6 µm or less. The light source LS is optically connected to the optical modulator LM via the optical waveguide OW.

The second electronic circuit EC2 outputs an electric signal (control signal) for controlling the operation of the optical modulator LM. More specifically, the second electronic circuit EC2 controls the optical modulator LM based on the control signal received from the first electronic circuit EC1. The second electronic circuits EC2 are electrically connected to the optical modulator LM. The second electronic circuit EC2 is constituted by, for example, a well-known transceiver IC including a control circuit.

The optical modulator LM modulates the phase of the light emitted from the light source LS based on the control signal received from the second electronic circuit EC2. The optical modulator LM generates an optical signal including information included in the control signal. Examples of the type of the optical modulator LM include a Mach-Zehnder type light optical modulator and a ring type optical modulator. The optical modulator LM may be an electrically controlled optical modulator, a thermally controlled optical modulator, or a combined optical modulator using both electrical control and thermal control. The optical modulator LM is optically connected to the optical output part LO via the optical waveguide OW.

The optical output part LO outputs the optical signal modulated by the optical modulator LM to the outside of the semiconductor device SD. For example, the optical output part LO emits an optical signal toward an external optical fiber. Examples of the type of the light output part LO include a grating coupler (GC) and a spot size converter (SSC).

The optical input part LI inputs external light into the semiconductor device SD. For example, optical signal emitted from external optical fibers are inputted into the semiconductor device SD. Examples of the type of optical input part LI include a grating coupler (GC) and a spot size converter (SSC). The optical input part LI is optically connected to the optical receiver PR via the optical waveguide OW.

The optical receiver PR generates electron-hole pairs based on the optical signal received from the optical input part LI. The optical receiver PR converts an optical signal into an electric signal. The optical receiver PR may have photoelectric conversion characteristics. Examples of the type of the optical receiver PR include an avalanche photodiode type optical receiver. The optical receiver PR is electrically connected to the third electronic circuit EC3.

The third electronic circuit EC3 processes the electrical signal received from the optical receiver PR and outputs the processed electrical signal to the first electronic circuit EC1. More specifically, the third electronic circuit EC3 amplifies the electric signal received from the optical receiver PR and outputs the amplified electric signal to the first electronic circuit EC1. The third electronic circuit EC3 is constituted by, for example, a known receiver IC including an amplifier circuit.

Next, operation examples of the optoelectronic electric device LE according to the present embodiment will be described.

First, the transmission part of the opto-electric hybrid device LE will be described. The light emitted from the light source LS reaches the optical modulator LM via the optical waveguide OW. The second electronic circuit EC2 controls the operation of the optical modulator LM based on the control signal received from the first electronic circuit EC1, and modulates the light reaching the optical modulator LM.

As a result, the electric signal is converted into an optical signal. The optical signal reaches the optical output part LO via the optical waveguide OW, and the optical signal is output to the outside of the semiconductor device SD in the optical output unit LO. The optical signal outputted from the semiconductor device SD are guided to another semiconductor device via optical fibers or the like.

Next, the receiving part of the opto-electric hybrid device LE will be described. An optical signal guided from another semiconductor device through an optical fiber or the like reaches the optical input part LI. The optical signal is guided to the inside of the optical waveguide OW in the optical input part LI. The optical signal reaches the optical receiver PR via the optical waveguide OW, and is converted into an electric signal. The electric signal is processed by the third electronic circuit EC3 and then transmitted to the first electronic circuit EC1.

Next, the configuration of the semiconductor device SD according to the present embodiment will be described.

Figure 2:
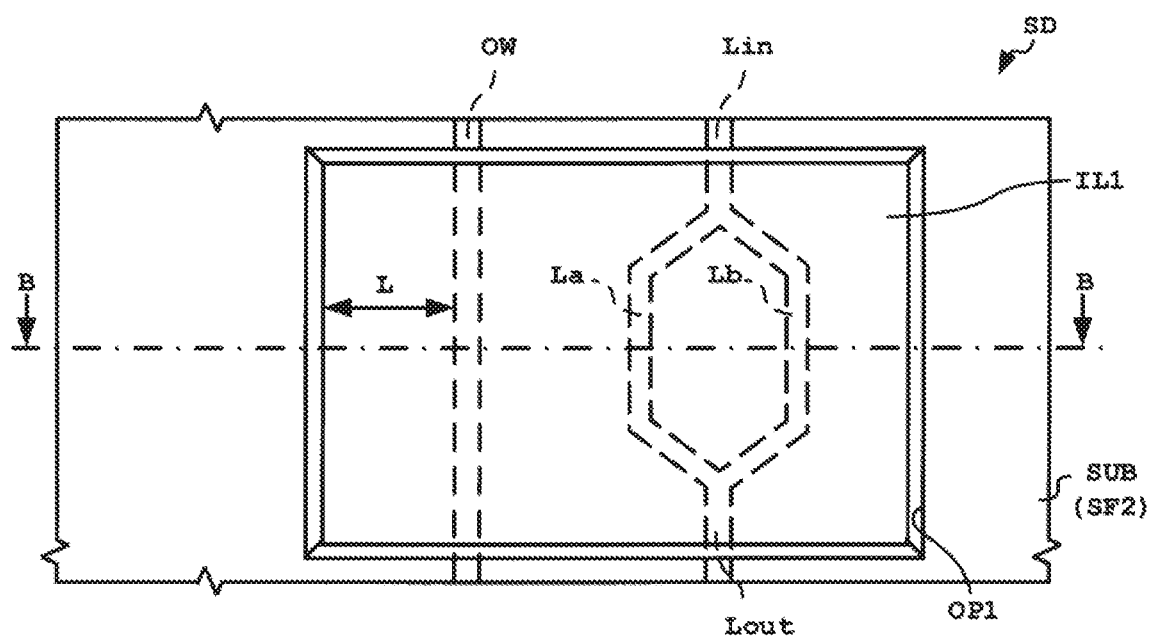
FIG. 2 is a bottom view of primary portion showing an exemplary configuration of a semiconductor device according to the embodiment.
Figure 3:
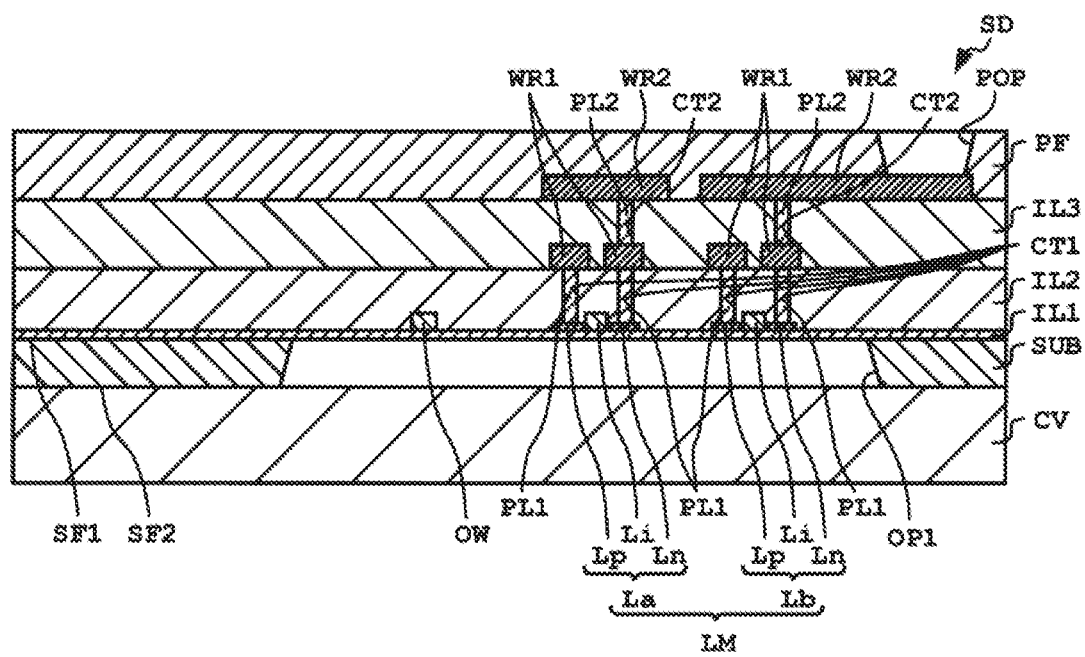
FIG. 3 is a cross-sectional view of primary portion showing an exemplary configuration of a semiconductor device according to the embodiment.

FIG. 2 is a bottom view of primary portion of the semiconductor device SD, and FIG. 3 is a cross-sectional view of primary portion of the semiconductor device SD taken along line B-B in FIG. 2. In FIG. 2, the cover CV is omitted.

As shown in FIG. 3, the semiconductor device SD includes a substrate SUB, a cover CV, a first insulating layer IL1, an optical waveguide OW, an optical modulator LM, a second insulating layer IL2, a first plug PL1, a first wiring WR1, a third insulating layer IL3, a second plug PL2, a second wiring WR2, and a protective film PF. In present embodiment, the second insulating layer IL2, the first plug PL1, the first wiring WR1, the third insulating layer IL3, the second plug PL2, the second wiring WR2, and the protective film PF constitute a wiring layer.

The substrate SUB is support member for supporting optical elements such as the optical waveguide OW and the optical modulator LM via the first insulating layers IL1. In present embodiment, the substrate SUB is located on the covers CV. The substrate SUB includes a first surface (top surface) SF1 and a second surface (back surface) SF2 that have top and back relation with each other. Examples of types of substrate SUB include silicone substrate. The silicon substrate is, for example, a silicon single-crystal substrate containing a p-type impurity such as boron (B) or phosphorus (P). For example, the plane orientation of the main surface (first surface SF1) of the silicon substrate is (100), and the resistivity of the silicon substrate is 5 Ω·cm or more and 50 Ω·cm or less. A thickness of the substrate SUB is, for example, 100 μm or more and 900 μm or less.

A first opening OP1 is formed on an area of the second surface SF2 of the substrate SUB which is located directly below the optical waveguide OW. The first opening portion OP1 is formed so as to open on the second surface SF2 of the substrate SUB so as to overlap with the optical waveguide OW in plan view. In present embodiment, the first opening OP1 is formed over a region of the substrate SUB located directly below the optical waveguide OW and a region of the optical modulator LM located directly below the optical modulator LM. The first opening OP1 is formed on the second surface SF2 of the substrate SUB so as to overlap the optical waveguide OW and the optical modulator LM in plan view. In other words, the first opening OP1 is formed on the second surface SF2 of the substrate SUB so as to overlap with the plurality of optical waveguides OW in plan view. From the viewpoint of suppressing the light seeping out of the optical waveguide OW from being scattered by the substrate SUB, it is preferable that the first opening OP1 is formed over a wider range than the region where the light seeping out of the optical waveguide OW toward the substrate SUB reaches.

The first opening OP1 may be a recess formed in the substrate SUB or may be a penetrating portion. When the first opening portion OP1 is a concave portion, the first opening portion OP1 is formed on the second surface SF2 so as not to reach the first surface SF1 of the substrate SUB, and a portion of the substrate SUB exists between the bottom surface of the concave portion and the first surface SF1. On the other hand, when the first opening OP1 is a penetrating portion, the first opening OP1 is formed on the second surface SF2 so as to reach the first surface SF1 of the substrate SUB (see FIG. 3). From the viewpoint of reducing optical losses due to the substrate SUB, it is preferable that the first opening OP1 is a penetrating portion. In present embodiment, the first opening OP1 is a penetrating portion. The first insulating layer IL1 is exposed at the bottom portion of the first opening portion OP1.

The size of the first opening OP1 can be appropriately set in accordance with the condition such as the area where the optical waveguide OW is formed, the thickness of the substrate SUB, the thickness of the first insulating layer IL1, and the wavelength of light. For example, the depth of the first opening OP1 is more preferably 100 μm or more and 900 μm or less. A depth of the first opening OP1 is equal to or less than the thickness of the substrate SUB. The distance L between the opening edge of the first opening OP1 and a side surface of the optical waveguide OW in the widthwise direction of the optical waveguide OW is preferably 3 μm or more. Here, the "width direction" of the optical waveguide OW means a direction along a direction perpendicular to the extending direction of the optical waveguide OW in plan view.

The shape of the first opening OP1 is not particularly limited. When looking at the first opening OP1 from the second surface SF2 side of the substrate SUB, examples of the shape of the first opening OP1 include polygonal, rectangular, circular and elliptical shapes. In present embodiment, as shown in FIG. 2, the shape of the first opening OP1 is a rectangular shape. The three-dimensional shape of the first opening OP1 is, for example, a frustum shape.

Cover CV supports substrate SUB. The cover CV is formed on the second surface SF2 of the substrate SUB so as to cover the first opening OP1 formed on the substrate SUB. In present embodiment, the cover CV is disposed such that the cover CV directly contacts with the second surface SF2 of the substrate SUB. It is preferable that the semiconductor device SD has the cover CV from the viewpoint of enhancing the mechanical strength of the semiconductor device SD. When a predetermined gas (to be described later) is accommodated in the first opening OP1, the substrate SUB is preferably in direct or indirect contact with the substrate SUB so that the gas in the first opening OP1 does not leak to the outside of the first opening OP1. Also, when the air pressure inside the first opening OP1 is different from the atmospheric pressure, it is preferable that the substrate SUB is in direct or indirect contact with the substrate SUB so that the air pressure inside the first opening OP1 is maintained. Examples of cover CV include glass substrate and silicone substrate.

The air pressure inside the first opening OP1 is preferably greater than the atmospheric pressure. As a result, the air pressure on the second surface SF2 side of the substrate SUB becomes greater than the air pressure on the first surface SF1 side of the substrate SUB. Therefore, stress is applied to the optical modulator LM in the semiconductor device SD, and the carrier mobility in the optical modulator LM can be increased. As a result, the modulation efficiency of the optical modulator LM can be increased, and the optical modulator LM can be miniaturized.

It is preferable that a predetermined gas, such as an inert gas or a dry gas, for example, dry air, be accommodated in the first opening OP1. As a result, it is possible to suppress the optical waveguide OW from being oxidized or corroded by water or oxygen contained in the first opening OP1, and as a result, it is possible to suppress optical losses when light passes through the optical waveguide OW. The inert gas is, for example, at least one selected from the group consisting of argon and nitrogen. The dry air is, for example, air of about 10% RH or less at room temperature.

The first insulating layer IL1 is formed on the first surface SF1 of the substrate SUB. The first insulating layer IL1 is formed of a material having a refractive index smaller than that of the material constituting the optical waveguide OW. Examples of materials constituting the first insulating layer IL1 include silicon oxide (SiO2). The refractive index of the material constituting the first insulating layer IL1 is, for example, 1.46 (SiO2). In this specification, the refractive index is a numerical value for light having a wavelength of 1.5 μm.

The lower limit of the thickness of the first insulating layer IL1 may be any thickness as long as the optical modulator LM and the substrate SUB are electrically insulated from each other via the first insulating layer IL1. For example, the thickness of the first insulating layer IL1 is 100 nm or more. From the viewpoint of reducing stress applied to the semiconductor device SD and from the viewpoint of suppressing sticking of the semiconductor wafer by the electrostatic chucks at the time of manufacturing the semiconductor device SD, the thickness of the first insulating layer IL1 is preferable small. For example, the thickness of the first insulating layer IL1 is 3 μm or less, preferable 2 μm or less, more preferably 1 μm or less, still more preferably 500 nm or less, and still more preferably about 10 0 nm.

The optical waveguide OW is a path through which light can be transmitted. The optical waveguide OW is formed on the first insulating layer IL1. In present embodiment, a plurality of optical waveguides are formed on the first insulating layer IL1 in a cross-sectional view. The plurality of optical waveguides may or may not be optically connected to each other. The optical waveguide OW is covered with the first insulating layer IL1 and the second insulating layer IL2. In present embodiment, the upper surface and both side surfaces of the optical waveguide OW directly contact with the second insulating layer IL2, and the lower surface of the optical waveguide OW directly contacts with the first insulating layer IL1. The optical waveguide OW is covered with a first insulating layer IL1 and a second insulating layer IL2 having a refractive index smaller than the refractive index of the materials constituting the optical waveguide OW. Thus, the light can travel inside the optical waveguide OW while being substantially confined inside the optical waveguide OW. However, the light travels inside the optical waveguide OW while seeping out to the outside of the optical waveguide OW by the wavelength order of the light.

The material constituting the optical waveguide OW is a semiconductor material which is transparent to light passing through the inside of the optical waveguide OW. Examples of semiconductor materials constituting the optical waveguide OW include silicon and germanium. The crystal structure of the semiconductor material constituting the optical waveguide OW may be single crystal or polycrystalline. The refractive index of the material constituting the optical waveguide OW is, for example, 3.5 (Si).

The width and height of the optical waveguide OW need only be such that light can properly pass through the inside of the optical waveguide OW. The width and height of the optical waveguide OW can be appropriately set in accordance with conditions such as the wavelength of light passing through the inside of the optical waveguide OW and the mode of the light. The width of the optical waveguide OW is, for example, 300 nm or more and 500 nm or less. The height of the optical waveguide OW is, for example, 200 nm or more and 300 nm or less.

The optical modulator LM modulates the phase of the light passing through the inside of the optical waveguide OW. The configuration of the optical modulator LM is not particularly limited, and, for example, a known configuration adopted as a optical modulator in the silicon photonics technology can be adopted. Examples of the type of the optical modulator LM include a pn-type optical modulator, a pin-type optical modulator, and a Semiconductor-Insulator-Semiconductor (SIS) type optical modulator. In present embodiment, the type of the optical modulator LM is a pin-type optical modulator.

As shown in FIGS. 2 and 3, the optical modulator LM has an optical waveguide Lin for inputting, two branch waveguides La and Lb branched from the optical waveguide Lin, and an optical waveguide Lout for outputting connected to the two branch waveguides La and Lb. In the optical modulator LM, the light traveling inside the optical waveguide Lin for inputting is split into two branch waveguides La and Lb, and after being given a phase difference in one or both of the two branch waveguides La and Lb, the light is combined in the optical waveguide Lout for outputting. Then, by interfering light generated in the optical waveguide Lout, the amplitudes of the light are controlled, and as a result, an optical signal can be generated.

Examples of the configurations (shape, material, and the like) of the optical waveguide Lin of the optical modulator LM, the portions (i-type semiconductors Li to be described later) through which the light of the branch waveguides La and Lb passes, and the optical waveguide Lout of the optical modulator LM are the same as the configuration of the optical waveguide OW.

The branch waveguides La and Lb have a p-type semiconductor portion Lp formed of a p-type semiconductor layer, an i-type semiconductor portion Li formed of an i-type semiconductor layer, and an n-type semiconductor portion Ln formed of an n-type semiconductor layer. Here, the i-type semiconductor portion Li also functions as an optical waveguide, and includes a first side surface and a second side surface positioned in the width direction of the i-type semiconductor portion. The first side surface and the second side surface are located on opposite sides of the i-type semiconductor portion Li. The p-type semiconductor portion Lp is formed adjacent to the first side surface of the i-type semiconductor portion Li. The n-type semiconductor portion Ln is formed adjacent to the second side surface of the i-type semiconductor portion Li. In other words, the i-type semiconductor portion Li is sandwiched between the p-type semiconductor portion Lp and the n-type semiconductor portion Ln in the width direction thereof. The p-type semiconductor portion Lp, the i-type semiconductor portion Li, and the n-type semiconductor portion Ln are formed integrally with each other. For example, the height (thickness) of the p-type semiconductor portion Lp and the height (thickness) of the n-type semiconductor portion Ln are ⅓ or more and ½ or less with respect to the height (thickness) of the i-type semiconductor portion Li, and are about 100 nm.

The optical modulator LM can control the phase of the light passing through the i-type semiconductor section Li by the carrier plasma effect. Specifically, by applying a bias (voltage) between the p-type semiconductor portion Lp and the n-type semiconductor portion Ln, carriers can be injected into the i-type semiconductor portion Li or carriers can be extracted from the i-type semiconductor portion Li. Thus, the carrier density inside the i-type semiconductor portion Li can be controlled. The phase of the light passing through the inside of the i-type semiconductor portion Li changes in accordance with the carrier density inside the i-type semiconductor portion Li.

Here, the p-type semiconductor layer constituting the p-type semiconductor portion Lp is a semiconductor layer containing p-type impurities such as boron (B) and boron difluoride (BF 2) and having impurity concentrations of $1 \times 10^{17}$ per cm3 or more. The n-type semiconductor layer constituting the n-type semiconductor portion Ln is a semiconductor layer containing an n-type impurity such as arsenic (As) or phosphorus (P) and having an impurity density of $1 \times 10^{17}/cm^3$ or more. Further, the i-type semiconductor layer constituting the i-type semiconductor portion Li is a semiconductor layer having an impurity density of less than $1 \times 10^{17}/cm^3$.

The second insulating layer IL2 is formed on the first insulating layer IL1 so as to cover the optical waveguide OW and the optical modulator LM. The second insulating layer IL2 is formed of a material having a refractive index smaller than that of the material constituting the optical waveguide OW. Examples of materials constituting the second insulating layer IL2 include silicon oxide ($SiO_2$). The refractive index of the material constituting the second insulating layer IL2 is, for example, 1.46 ($SiO_2$).

From the viewpoint of suppressing scattering of light seeped out of the optical waveguide OW by the first wiring WR1 formed on the second insulating layer IL2, the thickness of the second insulating layer IL2 is preferably 1 μm or more and 5 μm or less, more preferably 2 μm or more and 5 μm or less. A first through hole CT1 for forming a first plug PL1 is formed in the second insulating layer IL2. In present embodiment, the first through hole CT1 is formed so as to reach the optical modulator LM (p-type semiconductor portions Lp and n-type semiconductor portions Ln) along the thickness of the second insulating layer IL2.

The first plug PL1 electrically connects the optical modulator LM (p-type semiconductor portions Lp and n-type semiconductor portions Ln) and the first wiring WR1 to each other. The first plug PL1 is formed so as to reach the optical modulator LM (p-type semiconductor portions Lp and n-type semiconductor portions Ln) along the thickness of the second insulating layers IL2. The first plugs PL1 are formed of a conductive film embedded in the first through holes CT1. As the first plug PL1, a well-known structure adopted as a plug in the semiconductor technology can be adopted. Examples of material of the first plugs PL1 include tungsten (W).

The first wiring WR1 is formed on the second insulating layer IL2. The first wiring WR1 is electrically connected to the optical modulator LM (the p-type semiconductor portion Lp and the n-type semiconductor portion Ln) via the first plugs PL1. For the first wiring WR1, a well-known structure employed as a wiring in the semiconductor technology can be employed. Examples of the first wiring WR1 include an aluminum wiring in which a titanium layer, a titanium nitride layer, an aluminum layer, a titanium nitride layer, and a titanium layer are stacked in this order. Instead of the aluminum layer, a copper layer or a tungsten layer may be used. In present embodiment, the first wiring WR1 is the aluminum wiring.

The third insulating layer IL3 is formed on the second insulating layer IL2 so as to cover the first wiring WR1. Examples of material constituting the third insulating layer IL3 are the same as those of the second insulating layer IL2. A thickness of the third insulating layer IL3 is, for example, 0.8 μm or more and 1.2 μm or less. A second through hole CT2 for forming a second plug PL2 is formed in the third insulating layer IL3. The second through hole CT2 is formed to reach the first wiring WR1 along the thickness of the third insulating layer IL3.

The second plugs PL2 electrically connect the first wiring WR1 and the second wiring WR2 to each other. The second plug PL2 is formed so as to reach the first wiring WR1 along the thickness of the third insulating layer IL3. The second plug PL2 is formed of a conductive film buried in the second through hole CT2. As for the second plug PL2, a well-known structure adopted as a plug in the semiconductor technology can be adopted. Examples of materials for the second plug PL2 include aluminum.

The second wiring WR2 is formed on the third insulating layer IL3. The second wiring WR2 is electrically connected to the first wiring WR1 through the second plug PL2. For the second wiring WR2, a well-known structure employed as a wiring in the semiconductor technology can be employed. Examples of materials of the second wiring WR2 are similar to those of the first wiring WR1.

The protective film PF is formed on the third insulating layer IL3. The protective film PF is formed with a pad opening POP exposing the second wiring WR2 to the outside of the pad opening POP. The protective film PF may protect the semiconductor device SD. Examples of material for the protective film PF include silicon oxide, silicon oxynitride, silicon nitride, and Phospho Silicate Glass. A thickness of the protective film PF is, for example, 0.3 μm or more and 0.7 μm or less. A portion of the second wiring WR2 is exposed inside the pad opening portion POP formed in the protective film PF. The exposed portion of the second wiring WR2 constitutes, for example, a pad portion for being connected to an external wiring such as a bonding wire. From the viewpoint of suppressing the damage to the semiconductor device SD due to the impact when the external wiring is connected to the pad portion, it is preferable that the pad opening POP (pad portion) is located in an area that differs from the first opening OP1 in plan view.

Here, the operation of the first opening OP1 will be described. In present embodiment, the first opening OP1 overlaps with the optical waveguide OW in plan view. When the thickness of the first insulating layer IL1 is small, the light seeping out from the optical waveguide OW toward the substrate SUB side can reach a region (substrate SUB side) farther from the region where the first insulating layer IL1 is formed. Even in this instance, in the semiconductor device SD according to the present embodiment, since the first opening OP1 is formed on the substrate SUB, the light seeped out does not reach the substrate SUB below the first opening OP1. As a result, light can be suppressed from being scattered by the substrate SUB, and light losses can be reduced.

Next, an exemplary manufacturing method of semiconductor device SD according to present embodiment will be described. FIGS. 4 to 20 are cross-sectional views of primary portion showing example of the steps included in the method of manufacturing the semiconductor device SD.

The method of manufacturing semiconductor device SD according to present embodiment includes (1) providing a semiconductor wafer SW including a substrate SUB, a first insulating layer, and an optical waveguide OW, (2) forming a wiring layer, (3) forming a first opening OP1 on a second surface SF2 of the semiconductor wafer SW, and (4) disposing a cover CV so as to cover the first opening OP1.

Figure 4:
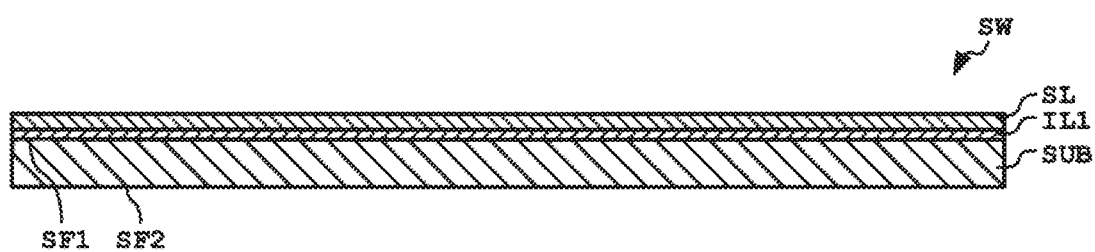
FIG. 4 is a cross-sectional view of primary portion showing an exemplary process included in a method of manufacturing the semiconductor device according to the embodiment.

First, as shown in FIG. 4, a semiconductor wafer SW including a substrate SUB, a first insulating layer IL1 formed on the substrate SUB, and a semiconductor layer SL formed on the first insulating layer IL1 is provided. The semiconductor wafer SW may be manufactured or purchased as a commercial product.

The semiconductor wafer SW is, for example, an SOI (Silicon On Insulator) substrate. The method of manufacturing SOI substrate can be appropriately selected from a known manufacturing method. Examples of manufacturing SOI substrate include Separation by Implantation of Oxygen (SIMOX) and smart-cut methods.

Examples of material of substrate SUB are described above. A thickness of the substrate SUB is, for example, 700 µm to 900 µm. Examples of material and thicknesses of the first insulating layers IL1 are as described above. Examples of material for the semiconductor layer SL include silicon and germanium. The crystal structure of the material of the semiconductor layer SL may be single crystal or polycrystalline.

Next, the semiconductor wafer SW provided is processed to form optical elements such as the optical waveguide OW and the optical modulator LM. In the present embodiment, the optical waveguide OW and the optical modulator LM are formed by the following procedures.

Figure 5:
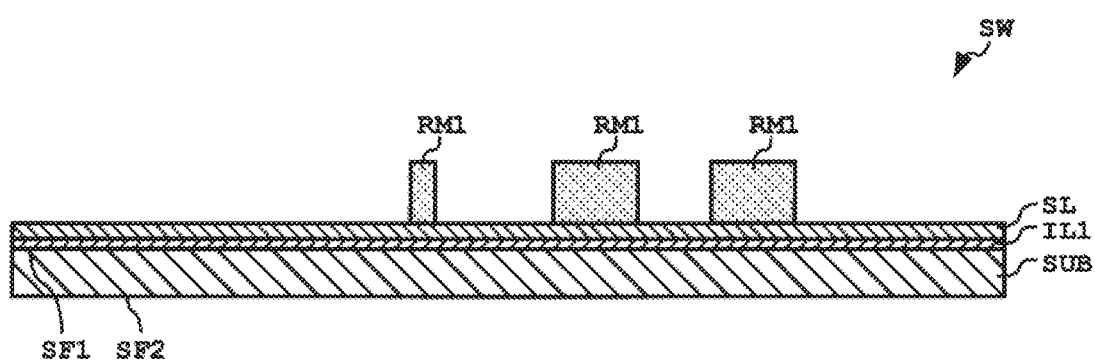
FIG. 5 is a cross-sectional view of primary portion showing an exemplary process included in the method of manufacturing the semiconductor device according to the embodiment.

First, as shown in FIG. 5, a resist mask RM1 having desired patterns is formed on the semiconductor layer SL. The resist mask RM1 is formed so as to cover a region of the semiconductor layer SL to be the optical waveguide OW and the optical modulator LM, and to expose a region of the semiconductor layer SL other than the region. The method for forming the resist mask RM1 is not particularly limited, and may be appropriately selected from known methods. Examples of the method of forming the resist mask RM1 include a photolithography method. The resist mask RM1 may be formed to cover other regions of the semiconductor layer SL as required. For example, the resist mask RM1 may be formed so as to cover regions of the semiconductor layer SL where other optical elements such as a light receiving portion and a grating coupler are formed.

Figure 6:
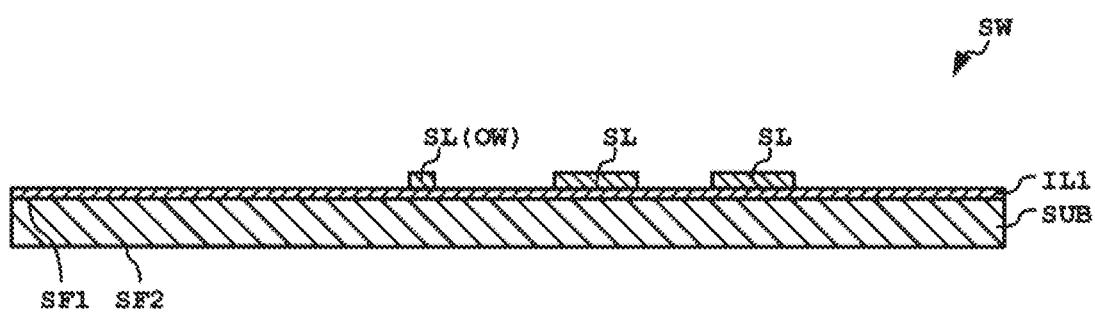
FIG. 6 is a cross-sectional view of primary portion showing an exemplary process included in the method of manufacturing the semiconductor device according to the embodiment.

Next, as shown in FIG. 6, a portion of the semiconductor layer SL is etched by a desired thickness by using the resist mask RM1 as an etching mask. In present embodiment, a portion of the semiconductor layer SL exposed from the resist mask RM1 is etched by the thickness of the semiconductor layer SL. At this time, the etching is performed in a state in which the semiconductor wafer SW is fixed to the electrostatic chuck. The method of etching the semiconductor layer SL is not particularly limited, and may be appropriately selected from known methods. Examples of the method of etching the semiconductor layer SL include a dry etching method. After the etching, the resist mask RM1 is removed. Thus, the optical waveguide OW can be formed.

Figure 7:
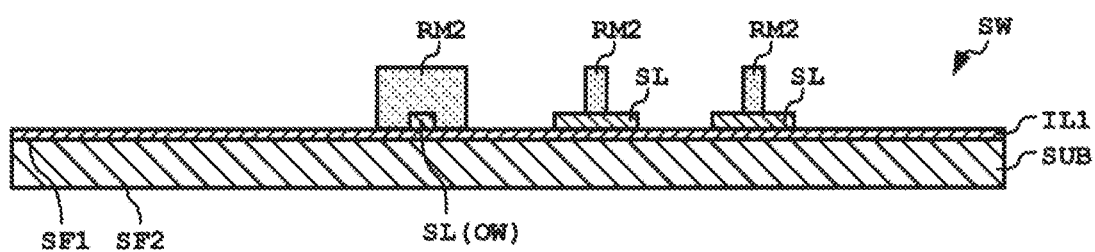
FIG. 7 is a cross-sectional view primary portion showing an exemplary process included in the method of manufacturing the semiconductor device according to the embodiment.

Next, as shown in FIG. 7, a resist mask RM2 having desired patterns is formed on the semiconductor layer SL by photolithography. The resist mask RM2 is formed so as to cover a region of the semiconductor layer SL that becomes the i-type semiconductor portion Li of the optical waveguide OW and the optical modulator LM, and to expose a region of the semiconductor layer SL other than the region. The resist mask RM2 may be formed to cover other regions of the semiconductor layer SL as required. For example, the resist mask RM2 may be formed so as to cover regions of the semiconductor layer SL where other optical elements such as a light receiving portion and a grating coupler are formed.

Figure 8:
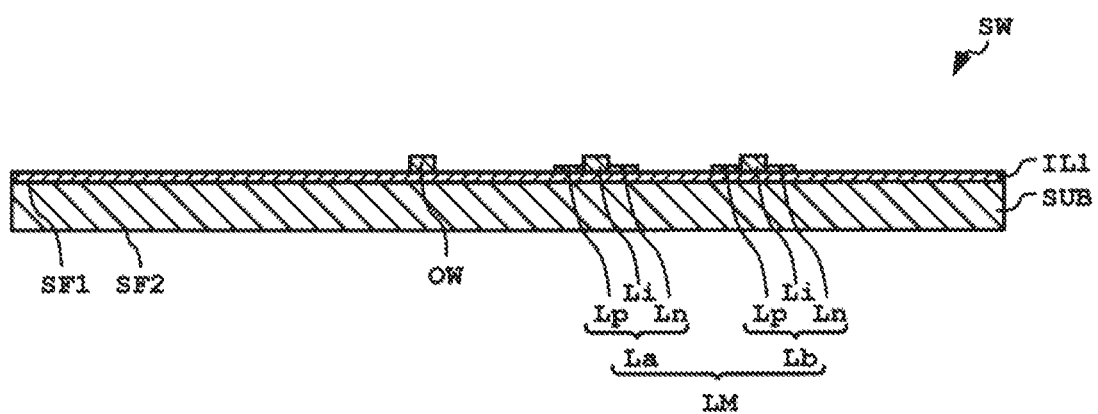
FIG. 8 is a cross-sectional view of primary portion showing an exemplary process included in the method of manufacturing the semiconductor device according to the embodiment.

Next, as shown in FIG. 8, another portion of the semiconductor layer SL is etched by a desired thickness by a dry etching method using the resist mask RM2 as an etching mask. In present embodiment, a portion of the semiconductor layer SL exposed from the resist mask RM2 is partially etched so as to remain in the thickness of the semiconductor layer SL. At this time, the etching is performed in a state in which the semiconductor wafer SW is fixed to the electrostatic chuck. After the etching, the resist mask RM2 is removed.

Next, a resist mask having a desired pattern is formed on the semiconductor layer SL by a photolithography method, although not particularly illustrated. The resist mask is formed so as to expose a region of the semiconductor layer SL to be the p-type semiconductor portion Lp in the optical modulator LM and to cover a region other than the region. Next, using the resist mask as an ion implantation mask, the above mentioned p-type impurities are ion-implanted into the semiconductor layer SL (a portion corresponding to a region to be the p-type semiconductor portion Lp). Thus, the p-type semiconductor portion Lp of the optical modulator LM is formed. Next, the resist mask is removed. By the same method, the n-type semiconductor portion Ln of the optical modulator LM can also be formed. As a result, the optical modulator LM can be formed. Through the above steps, the semiconductor wafer SW including the substrate SUB, the first insulating layer IL1, the optical waveguide OW, and the optical modulator LM can be prepared.

Next, the wiring layer is formed. As described above, in the present embodiment, the wiring layer includes the second insulating layer IL2, the first plug PL1, the first wiring WR1, the third insulating layer IL3, the second plug PL2, the second wiring WR2, and the protective film PF.

Figure 9:
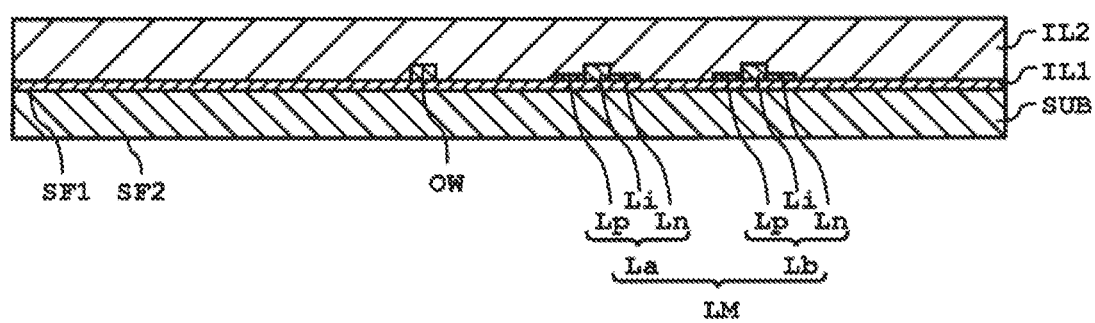
FIG. 9 is a cross-sectional view of primary portion showing an exemplary process included in the method of manufacturing the semiconductor device according to the embodiment.

First, as shown in FIG. 9, a second insulating layer IL2 is formed on the first insulating layer IL1 so as to cover the optical waveguide OW and the optical modulator LM. The way of forming the second insulating layer IL2 is not particularly limited, and may be appropriately selected from known methods. Examples of the method of forming the second insulating layer IL2 include a CVD (Chemical Vapor Deposition) method. Examples of materials constituting the second insulating IL2 include silicon oxide. Note that the upper surface of the second insulating layer IL2 may be subjected to a planarization treatment as required. Examples of the upper surface planarization treatment of the second insulating layer IL2 include a reflow method, an etch-back method, and a Chemical Mechanical Polishing (CMP) method.

Figure 10:
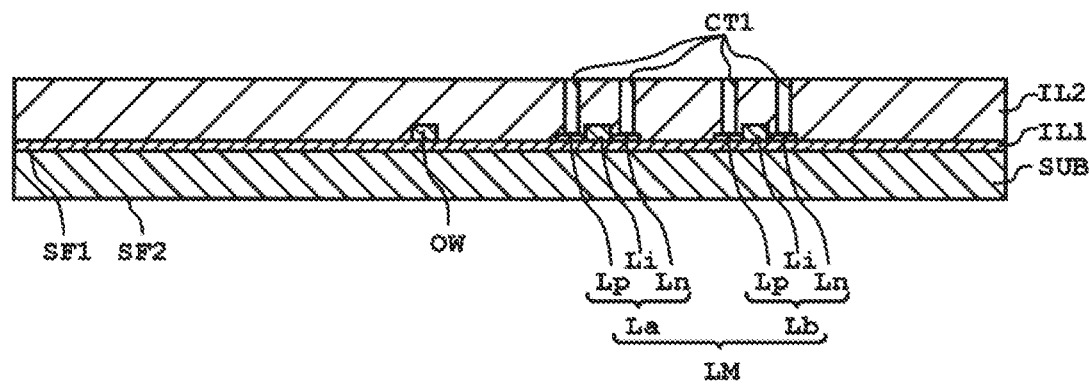
FIG. 10 is a cross-sectional view of primary portion showing an exemplary process included in the method of manufacturing the semiconductor device according to the embodiment.

Next, as shown in FIG. 10, a first through hole CT1 reaching the p-type semiconductor portion Lp and the n-type semiconductor portion Ln in the optical modulator LM is formed in the second insulating layer IL2. The method of forming the first through hole CT1 is not particularly limited, and may be appropriately selected from known methods. The first through hole CT1 may be formed by forming a resist mask having desired patterns on the second insulating layer IL2 by photolithography, and then etching the second insulating layer IL2 by dry etching. At this time, the etching is performed in a state in which the semiconductor wafer SW is fixed to the electrostatic chuck.

Figure 11:
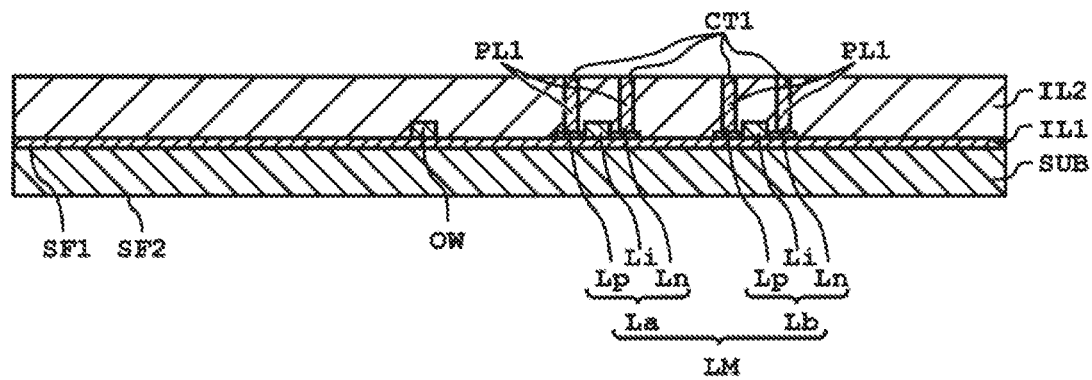
FIG. 11 is a cross-sectional view of primary portion showing an exemplary process included in the method of manufacturing the semiconductor device according to the embodiment.

Next, as shown in FIG. 11, first plug PL1 is formed to fill the first through hole CT. The method of forming the first plug PL1 is not particularly limited, and may be appropriately selected from known methods. The first plug PL1 may be formed by forming a conductive film by a CVD method so as to fill the first through hole CT, and then removing the conductive film formed outside the first through holes CT by a CMP method. Examples of the material of the conductive film include tungsten.

Figure 12:
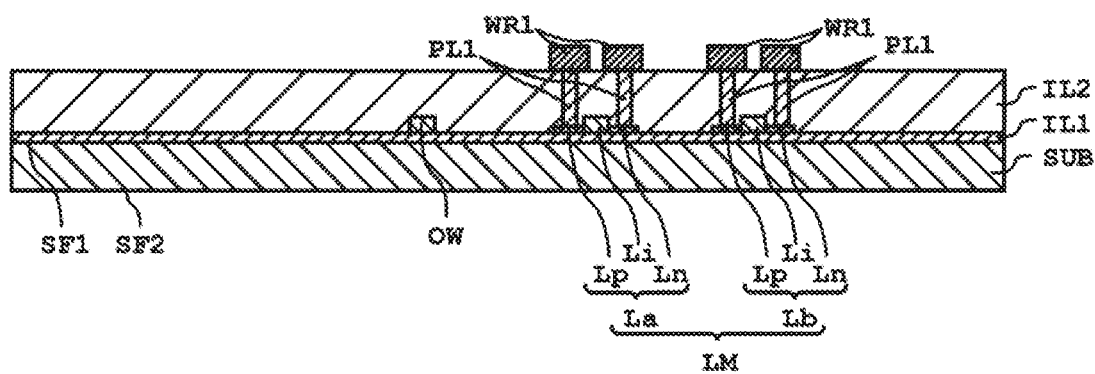
FIG. 12 is a cross-sectional view of primary portion showing an exemplary process included in the method of manufacturing the semiconductor device according to the embodiment.

Next, as shown in FIG. 12, a first wiring WR1 electrically connected to the first plugs PL1 is formed. In present embodiment, the first wiring WR1 is an aluminum wiring formed on the second insulating IL2. The method of forming the first wiring WR1 is not particularly limited, and may be appropriately selected from known methods. For example, after a stacked film in which a titanium layer, a titanium nitride layer, an aluminum layer, a titanium nitride layer, and a titanium layer are stacked in this order is formed over the second insulating layer IL2 by a sputtering method, a resist mask having desired patterns is formed over the stacked film by a lithography method. Next, using the resist mask as an etching mask, the stacked film is patterned by a dry etching method, whereby a first wiring WR1 can be formed. At this time, the etching is performed in a state in which the semiconductor wafer SW is fixed to the electrostatic chuck.

Figure 13:
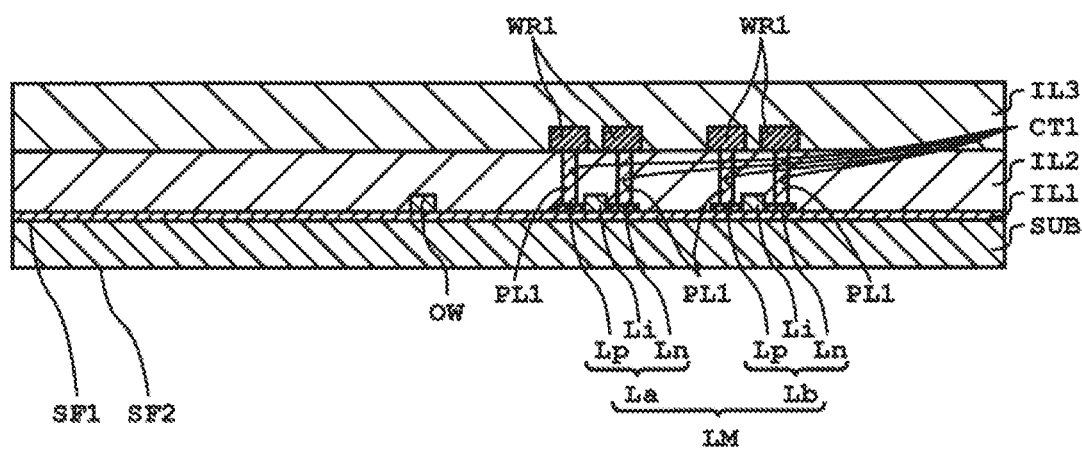
FIG. 13 is a cross-sectional view of primary portion showing an exemplary process included in the method of manufacturing the semiconductor device according to the embodiment.

Next, as shown in FIG. 13, a third insulating layer IL3 is formed on the second insulating layer IL2. In present embodiment, the third insulating layer IL3 is formed on the second insulating layer IL2 so as to cover the first wiring WR1. Examples of the method of forming the third insulating layer IL3 are the same as the method of forming the second insulating layer IL2.

Figure 14:
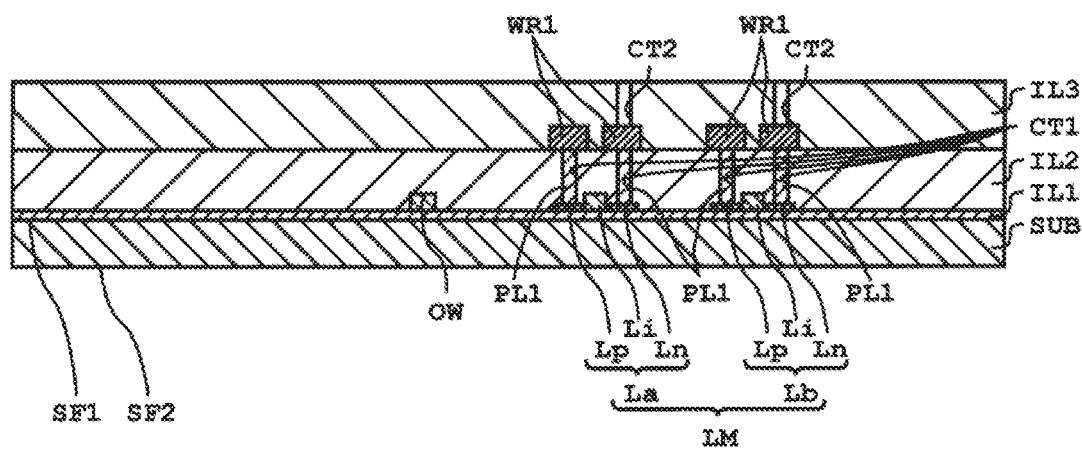
FIG. 14 is a cross-sectional view of primary portion showing an exemplary process included in the method of manufacturing the semiconductor device according to the embodiment.

Next, as shown in FIG. 14, a second through hole CT2 reaching the first wiring WR1 is formed in the third insulating layer IL3. Examples of the method of forming the second through hole CT2 are the same as the method of forming the first through hole CT1.

Figure 15:
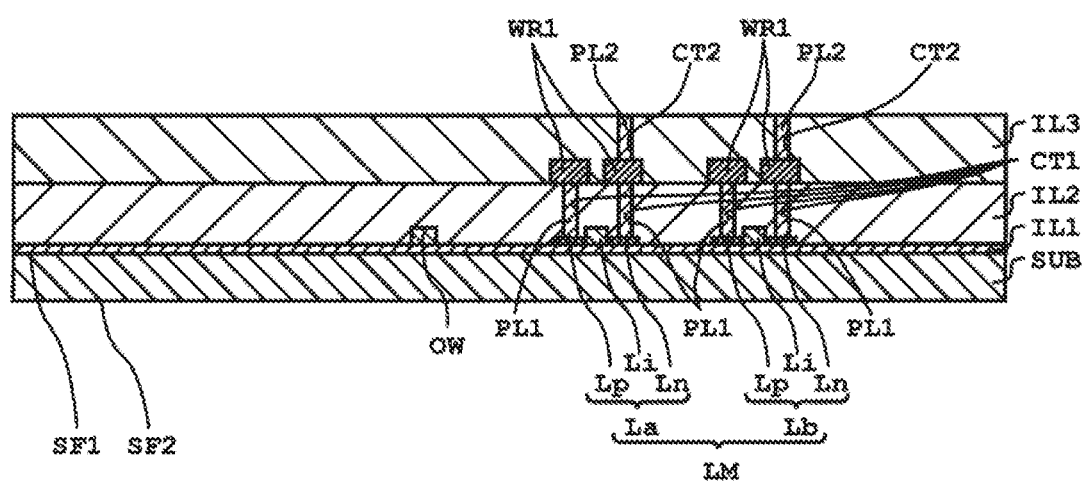
FIG. 15 is a cross-sectional view of primary portion showing an exemplary process included in the method of manufacturing the semiconductor device according to the embodiment.

Next, as shown in FIG. 15, a second plug PL2 is formed so as to fill the second through hole CT2. Examples of the method of forming the second plug PL2 are the same as the method of forming the first plug PL1.

Figure 16:
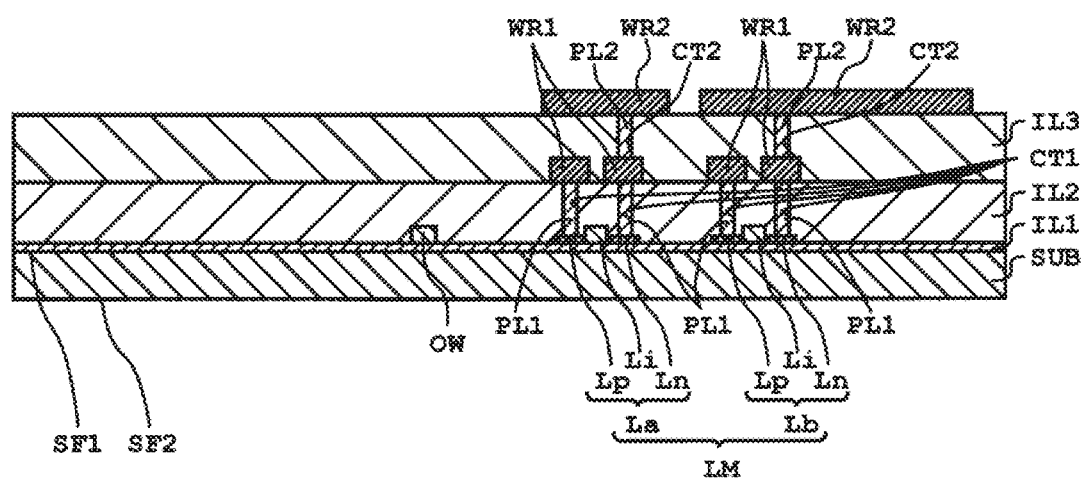
FIG. 16 is a cross-sectional view of primary portion showing an exemplary process included in the method of manufacturing the semiconductor device according to the embodiment.

Next, as shown in FIG. 16, a second wiring WR2 electrically connected to the second plug PL2 is formed. In present embodiment, the second wiring WR2 is an aluminum wiring formed on the third insulating IL3. Examples of the method of forming the second wiring WR2 are the same as the method of forming the first wiring WR1.

Figure 17:
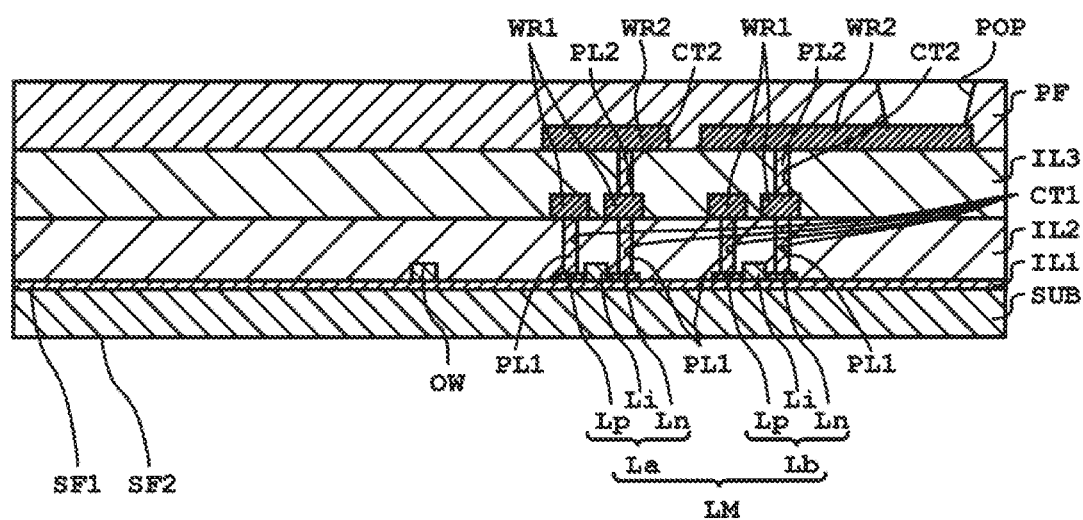
FIG. 17 is a cross-sectional view of primary portion showing an exemplary process included in the method of manufacturing the semiconductor device according to the embodiment.

Next, as shown in FIG. 17, the protective film PF is formed on the third insulating layer IL3. In present embodiment, the protective film PF is formed on the third insulating layer IL3 so as to cover the second wiring WR2. The method of forming the protective film PF is not particularly limited, and may be appropriately selected from known methods. Examples of the method of forming the protective film PF include a sputtering method. Examples of materials for the protective film PF include silicon oxide, silicon oxynitride, silicon nitride, and Phospho Silicate Glass (PSG).

Next, although not particularly illustrated, a resist mask is formed on the protective film PF located on a portion of the second wiring WR2 by a photolithography method. Next, using the resist mask as an etching mask, a portion of the protective film PF is removed by a dry etching method. As a result, the pad opening POP exposing a portion of the second wiring WR2 can be formed in the protective film PF. The portion of the second wiring WR2 exposed from the pad opening POP constitutes a pad portion. At this time, the etching is performed in a state in which the semiconductor wafer SW is fixed to the electrostatic chuck.

Figure 18:
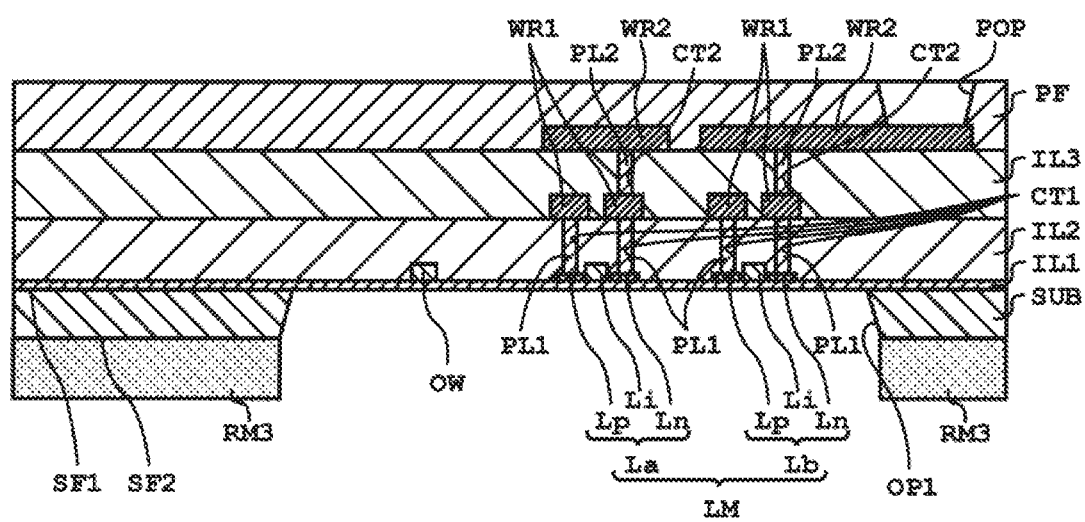
FIG. 18 is a cross-sectional view of primary portion showing an exemplary process included in the method of manufacturing the semiconductor device according to the embodiment.

Next, as shown in FIG. 18, a first opening OP1 is formed on the second surface (back surface) SF2 of the semiconductor wafer SW. More specifically, the first opening OP1 is formed on a region of the second surface SF2 of the substrate SUB, the region being located directly under one or both of the optical waveguide OW and the optical modulator LM. In present embodiment, the first opening OP1 is formed so as to overlap both the optical waveguide OW and the optical modulator LM when viewed from the bottom, as shown in FIG. 2.

The method of manufacturing the semiconductor device SD according to the present embodiment may include a step of grinding the substrate SUB (second surface SF2). By previously reducing the thickness of the substrate SUB to a desired thickness, the first opening OP1 can be easily formed. From the viewpoint of easiness of forming the first opening OP1, it is preferable to grind the thickness of the substrate SUB to about 400 nm in advance.

Here, the step of forming the first opening OP1 will be described in detail. First, as shown in FIG. 18, a resist mask RM3 having desired patterns is formed on the second surface SF2 of the substrate SUB by photolithography. The resist mask RM3 is formed so as to expose a region overlapping both the optical waveguide OW and the optical modulator LM in bottom view, and to expose a region other than the region of the second surface SF2 of the substrate SUB.

Figure 19:
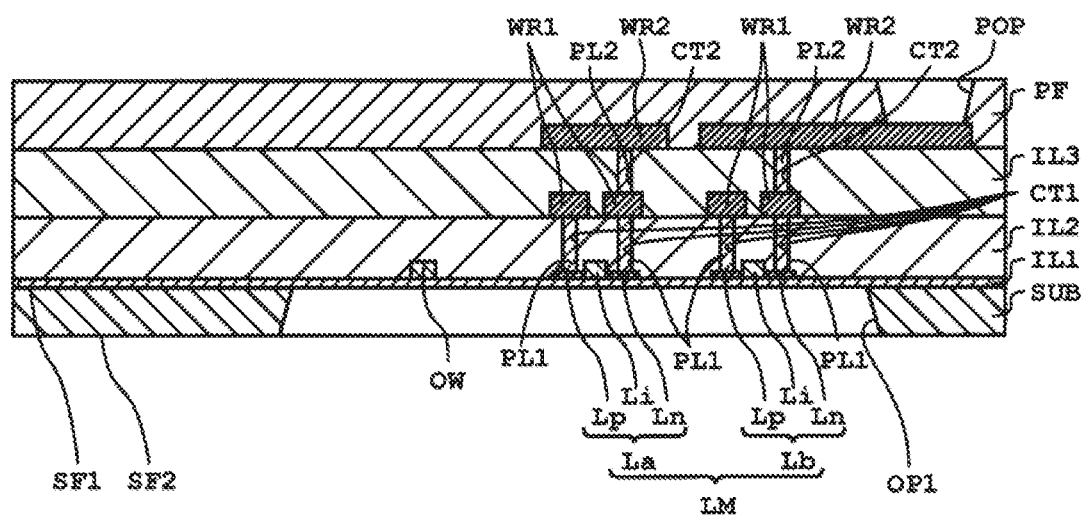
FIG. 19 is a cross-sectional view of primary portion showing an exemplary process included in the method of manufacturing the semiconductor device according to the embodiment.

Next, as shown in FIG. 19, a resist mask RM3 is used as the etching mask to remove a portion of the substrate SUB. In present embodiment, the first opening OP1 is a penetration that penetrates a portion of the substrate SUB. At this time, the first insulating layer IL1 functions as an etching stopper and is exposed in the first opening portion OP1. Thereby, the variation in the depth of the first opening OP1 can be reduced. The method of removing the substrate SUB (the method of forming the first opening OP1) is not particularly limited, and may be appropriately selected from known methods. Examples of the method of removing the semiconductor layer SL include a dry etching method and a wet etching method. After the etching, the resist mask RM3 is removed.

Figure 20:
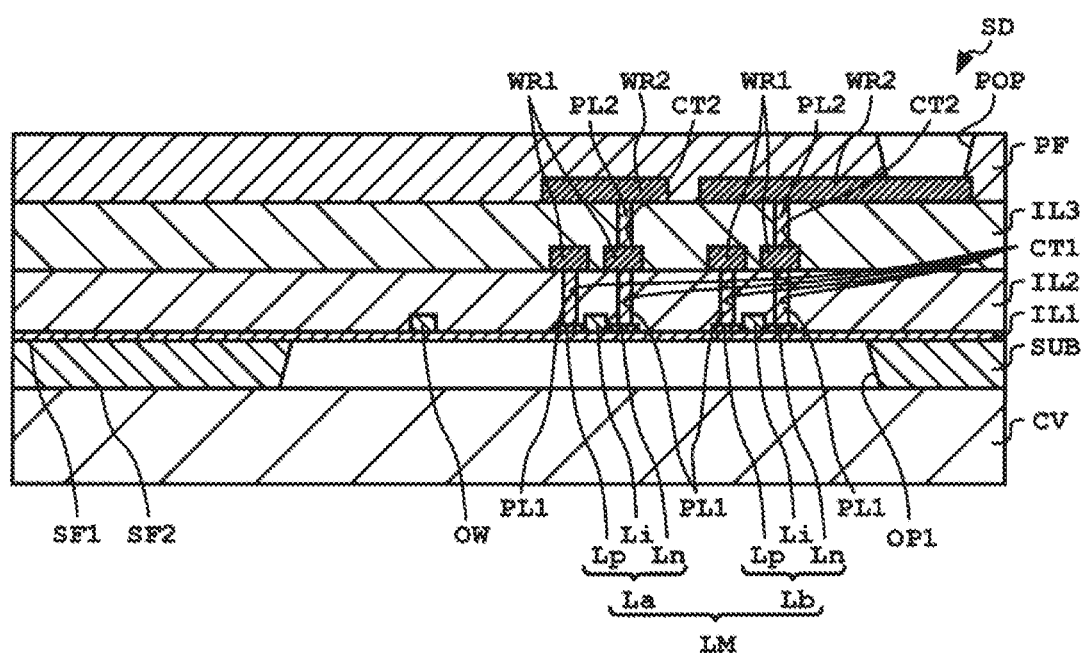
FIG. 20 is a cross-sectional view of primary portion showing an exemplary process included in the method of manufacturing the semiconductor device according to the embodiment.

Next, as shown in FIG. 20, the cover CV is disposed on the second surface SF2 of the substrate SUB so as to cover the first opening OP1. Specifically, the cover CV and the substrate SUB are fixed to each other while the cover CV is disposed on the second surface SF2 of the substrate SUB so as to cover the first opening OP1. Examples of methods of securing covers CV and substrate SUB together include anodic bonding. Examples of materials for the cover CV are described above.

As described above, the pressure inside the first opening OP1 may be greater than the atmospheric pressure. In this instance, in an atmosphere filled with a gas having a desired atmospheric pressure, the atmospheric pressure inside the first opening OP1 can be adjusted by disposing the cover CV on the second surface SF2 of the substrate SUB and fixing the cover CV and the substrate SUB to each other.

A predetermined gas such as an inert gas or a dry gas may be accommodated in the first opening OP1. Again, the desired gas may be contained within the first opening OP1 by placing the cover CV on the second surface SF2 of the substrate SUB and securing the cover CV and the substrate SUB together in an atmosphere filled with a predetermined gas to be contained within the first opening OP1.

Finally, a plurality of singulated semiconductor devices SD are obtained by dicing the semiconductor wafer SW laminated to the cover CV.

According to the above manufacturing method, the semiconductor device SD related to present embodiment can be manufactured. The method of manufacturing the semiconductor device SD according to the present embodiment may further include other steps as required. For example, examples of other steps include arranging a laser diode as a light source, forming a grating coupler, forming a spot size converter, and forming a optical receiver.

Methods for obtaining singulated semiconductor device SDs are also not particularly limited. For example, prior to the step of disposing the cover CV, the semiconductor wafer SW may be diced in advance, and then the substrate SUB and the cover CV may be fixed to each other. Alternatively, the semiconductor wafer SW may be partially diced to form an intermediate body, and the intermediate body and the cover CV may be fixed to each other, and then diced to obtain the singulated semiconductor device SD.

In the semiconductor device SD according to the present embodiment, the first opening OP1 is formed on the second surface SF2 of the substrate SUB. The first opening OP1 may be formed after the optical elements and the wiring layers are formed. Therefore, the wiring layer may be stably supported by the substrate SUB and the first insulating layer IL1. As a result, the semiconductor device SD according to the present embodiment can be easily manufactured without impairing reliability. As a result, the reliability of the semiconductor device SD can be enhanced.

Here, for comparison, a semiconductor device RSD (hereinafter also referred to as "semiconductor device according to a comparative example") having a cavity RCV formed by removing a portion of the first insulating layer RIL1 instead of the substrate RSUB will be described.

Figure 21:
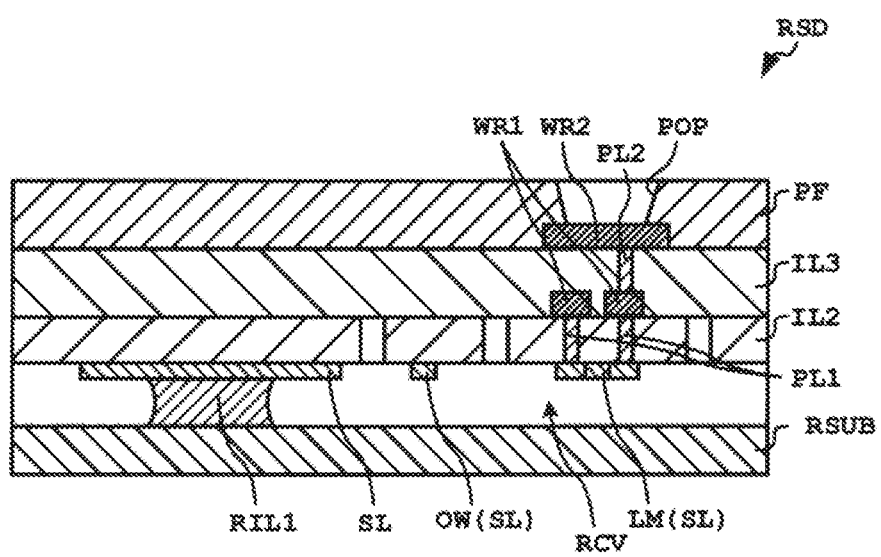
FIG. 21 is a cross-sectional view of primary portion showing a configuration of a semiconductor device according to a comparative embodiment.

FIG. 21 is a cross-sectional view of primary portion showing the configuration of the semiconductor device RSD according to the comparative example. As shown in FIG. 21, the semiconductor device RSD according to the comparative example includes a substrate RSUB, a first insulating layer RIL1, an optical waveguide OW, and a wiring layer.

In the semiconductor device RSD according to the comparative example, no opening is formed on the substrate RSUB. Instead, the cavity portion RCV surrounded by the substrate RSUB and the second insulating layer IL2 is formed by removing a portion of the first insulating layer RIL1. In the semiconductor device RSD, the wiring layer needs to be supported via the first insulating layer RIL1 remaining without being removed when the cavity RCV is formed. Further, in the manufacturing process of the semiconductor device RSD, since the wiring layers need to be formed in a state in which the cavity portion RCV is formed, it is difficult to manufacture the semiconductor device RSD in a state in which the cavity portion RCV is maintained. Even if the semiconductor device RSD can be manufactured, the reliability of the semiconductor device RSD may be lowered.

Further, in the semiconductor device SD according to the present embodiment, since the first opening OP1 is a penetrating portion penetrating the substrate SUB, it is possible to more effectively suppress light seeping out of the optical waveguide OW from being scattered by the substrate SUB.

Further, in the semiconductor device SD according to the present embodiment, the thickness of the first insulating layer IL1 does not need to be increased from the viewpoint of suppressing light scattering by the substrate SUB due to the first opening OP1 formed on the substrate SUB. As a result, it is possible to suppress large stress from being applied to the semiconductor device SD by the first insulating layers IL1. In addition, in the manufacturing process, when the semiconductor wafer SW is held by the electrostatic chuck, the accumulation of charges in the first insulating layer IL1 can be reduced. Thus, when the semiconductor wafer SW is released from the electrostatic chuck, it is possible to suppress the semiconductor wafer SW from sticking to the electrostatic chuck and cracking of the semiconductor wafer SW. As a result, it is possible to suppress a decrease in yield due to cracking of the semiconductor wafer SW.

[Modification]

Figure 22:
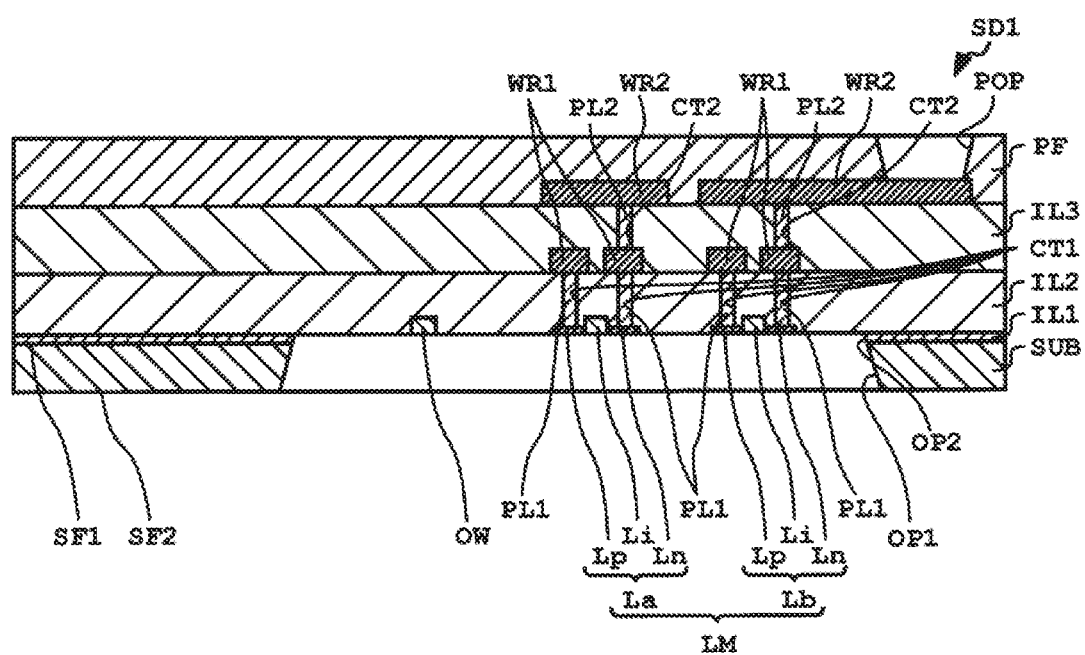
FIG. 22 is a cross-sectional view of primary portion showing the configuration of the semiconductor device according to a first modification of the embodiment.
Figure 23:
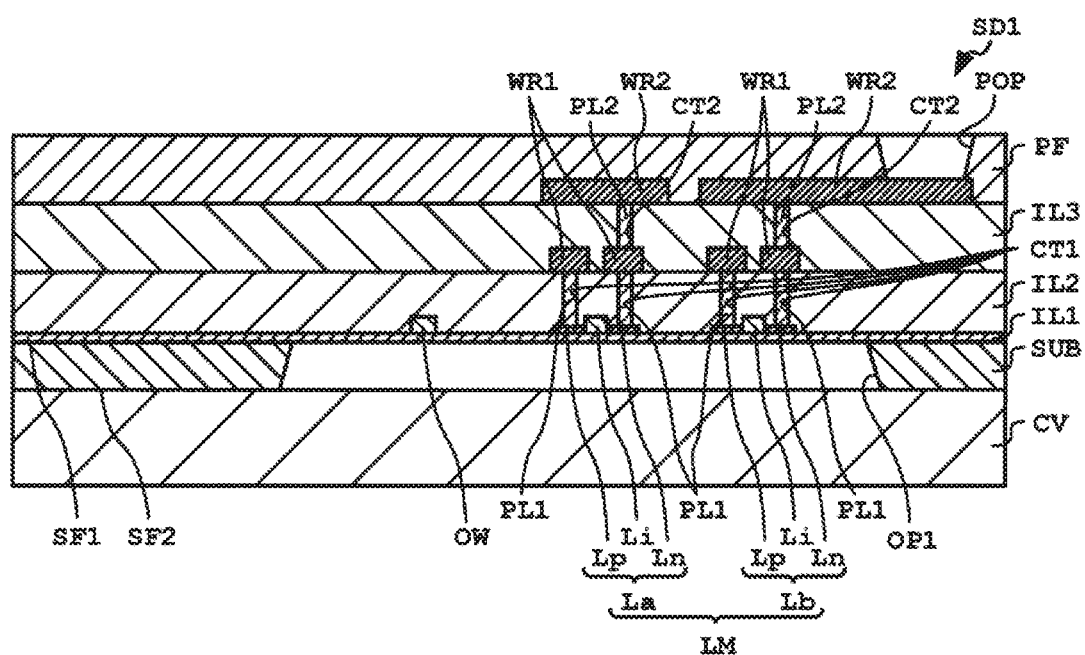
FIG. 23 is a cross-sectional view of primary portion showing the configuration of the semiconductor device according to a second modification of the embodiment.

FIG. 22 is a cross-sectional view of primary poriton showing an example of the configuration of the semiconductor device SD1 according to a first modification, and FIG. 23 is a cross-sectional view of primary poriton showing an example of the configuration of the semiconductor device SD2 according to a second modification.

As shown in FIG. 22, the semiconductor device SD1 according to the first modification further includes a second opening OP2 formed on the first insulating layer IL1. The second opening OP2 communicates with the first opening OP1 formed on the substrate SUB. In the semiconductor device SD1 according to first modification, the second opening OP2 is a penetrating portion penetrating through the first insulating layer IL1. In this instance, the optical waveguide OW and the i-type semiconductor portion Li of the optical modulator LM are exposed to the inside of the first opening OP1 and the second opening OP2. More specifically, the lower surface of the optical waveguide OW is exposed to the inside of the first opening OP1 and the second opening OP2. That is, the optical waveguide OW directly contacts with the gas accommodated in the first opening OP1 and the second opening OP2.

The difference between the refractive index of the material constituting the optical waveguide OW and the refractive index of the gas is greater than the difference between the refractive index of the material constituting the optical waveguide OW and the refractive index of the material constituting the first insulating IL1. As a result, the light passing through the optical waveguide OW can be more effectively confined in the optical waveguide OW. When the pressure inside the first opening OP1 and the second opening OP2 is greater than the atmospheric pressure, stress can be more effectively applied to the optical modulator LM (optical waveguide OW). As a result, the modulation efficiency of the optical modulator LM can be further enhanced.

As shown in FIG. 23, the semiconductor device SD2 according to the second modification does not need to have the cover CV. Also in this case, the same effect as in the above embodiment can be obtained.

It should be noted that the present invention is not limited to the above-mentioned embodiments, and various modifications can be made without departing from the gist thereof. For example, although the semiconductor device SD according to the above embodiment has the optical waveguide OW and the optical modulator LM as the optical element, the semiconductor device SD may have other optical elements such as a grating coupler, a spot size converter, and a light receiver as required.

In the above embodiment, the number of the wiring layers is two, but the number of the wiring layers may be three or more.

Although the first wiring WR1 and the second wiring WR2 are aluminum wiring, the first wiring WR1 and the second wiring WR2 may be copper wiring. In this instance, the copper wiring can be formed by, for example, a damascene method.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

What is claimed is:

1. A semiconductor device comprising:
   a substrate including a first surface and a second surface opposite the first surface;
   an insulating layer formed on the first surface;
   an optical waveguide formed on the insulating layer and formed of a semiconducting layer; and
   a cover disposed on the second surface of the substrate such that the cover covers the first opening,
   wherein a first opening is formed on the second surface,
   wherein the optical waveguide overlaps the first opening in plan view, and
   wherein an inert gas is contained in the first opening.

2. The semiconductor device according to claim 1, wherein the first opening penetrates through the substrate.

3. The semiconductor device according to claim 2,
   wherein a second opening is formed on the insulating layer,
   wherein the second opening penetrates through the insulating layer such that the second opening communicates with the first opening, and
   wherein the optical waveguide is exposed to inside of the first opening and the second opening.

4. The semiconductor device according to claim 1, wherein the inert gas is at least one selected from the group consisting of argon and nitrogen.

5. The semiconductor device according to claim 1, wherein dry air is contained in the first opening.

6. The semiconductor device according to claim 1, wherein the cover is a glass substrate or silicon substrate.

7. The semiconductor device according to claim 1, wherein a thickness of the insulating layer is 100 nm or more and 500 nm or less.

8. The semiconductor device according to claim 1, wherein the optical waveguide is a portion of an optical modulator for modulating a phase of light passing through the optical waveguide.

9. The semiconductor device according to claim 1,
   wherein the semiconductor device comprises a plurality of the optical waveguides, and
   wherein the plurality of the optical waveguides overlaps the first opening in plan view.

10. The semiconductor device according to claim 1, comprising a protective film formed on the substrate, the protective film having a pad opening formed therein,
    wherein the pad opening is formed at a position differing from the first opening in plan view.

11. A method of manufacturing a semiconductor device, comprising:
    providing a semiconductor wafer, the semiconductor wafer comprising:
      a substrate having a first surface and a second surface opposite the first surface;
      an insulating layer formed on the first surface; and
      an optical waveguide formed of a semiconductor layer and formed on the insulating layer;
    forming a wiring layer on the semiconductor wafer;
    forming a first opening on the second surface so as to overlap the optical waveguide in plan view after the forming the wiring layer; and
    disposing a cover over the substrate so as to cover the first opening,
    wherein, in disposing the cover, the cover is disposed on the substrate in an atmosphere containing an inert gas and is fixed to the substrate.

12. The method of manufacturing the semiconductor device according to claim 11, wherein, in forming the first opening, a penetrating portion is formed as the first opening in the substrate so as to expose the insulating layer.

13. The method of manufacturing the semiconductor device according to claim 11, comprising forming a second opening penetrating through the insulating layer so as to communicate with the first opening.

14. The method of manufacturing the semiconductor device according to claim 11, wherein the inert gas is at least one selected from the group consisting of argon and nitrogen.

15. A method of manufacturing a semiconductor device, the method comprising:
    providing a semiconductor wafer, the semiconductor wafer comprising:
      a substrate having a first surface and a second surface opposite the first surface;
      an insulating layer formed on the first surface; and
      an optical waveguide formed of a semiconductor layer and formed on the insulating layer;
    forming a wiring layer on the semiconductor wafer;
    forming a first opening on the second surface so as to overlap the optical waveguide in plan view after forming the wiring layer; and
    disposing a cover over the substrate so as to cover the first opening,
    wherein, in disposing the cover, the cover is disposed on the substrate in an atmosphere containing a dry air and is fixed to the substrate.

16. The semiconductor device according to claim 8, comprising:
    a wiring layer formed on the first surface of the substrate, the wiring layer comprising a wiring electrically connected with the optical modulator; and
    a protective film formed on the wiring layer, the protective film having a pad opening exposing a portion of the wiring layer,
    wherein the pad opening is formed on the protective film without overlapping the first opening in plan view.

* * * * *